CORDLESS TYPE SWITCHBOARD

Filed May 17, 1961 3 Sheets-Sheet 1

INVENTORS: A. B. DESNOES
D. P. FULLERTON
P. D. SHEA
BY E J Oleander
ATTORNEY

Aug. 20, 1963 A. B. DESNOES ET AL 3,101,393

CORDLESS TYPE SWITCHBOARD

Filed May 17, 1961 3 Sheets-Sheet 2

INVENTORS: A.B. DESNOES
D.P. FULLERTON
P.D. SHEA
BY
ATTORNEY

CORDLESS TYPE SWITCHBOARD

Filed May 17, 1961 3 Sheets-Sheet 3

INVENTORS: A.B. DESNOES
D.P. FULLERTON
P.D. SHEA
BY E J Olinder
ATTORNEY

United States Patent Office 3,101,393
Patented Aug. 20, 1963

3,101,393
CORDLESS TYPE SWITCHBOARD

Arnold B. Desnoes, Massapequa, Dick P. Fullerton, New York, and Philip D. Shea, Manhasset, N.Y., assignors to American Telephone and Telegraph Company, New York, N.Y., a corporation of New York
Filed May 17, 1961, Ser. No. 110,826
9 Claims. (Cl. 179—27)

This invention relates to telephone systems and more particularly to private branch exchange systems. Its principal object is to increase the station capacity of a private branch exchange system without a corresponding increase in its size or complexity.

In general, a private branch exchange, more commonly referred to as a PBX, provides for the selective interconnection of any one of a plurality of local stations or extensions with any one of a plurality of incoming trunk lines. Such exchanges are typically used where the number of extension lines does not, from an economic standpoint, warrant the employment of a fully automatic exchange. In many instances, however, the number of extension lines is too small to justify the installation of a fully automatic exchange and yet too large to permit convenient and efficient operation of a manual system by a single attendant.

Various means have been devised to simplify the operations required by an attendant in a relatively large PBX. These include the use of compact pushbutton-consoles having one pushbutton or key per extension line with distinctive lighting means for the various pushbuttons to indicate automatically the various steps taken in the completion of a call. The system disclosed by P. H. Arnold, A. B. Dosnoes, T. Stearn, G. D. Stewart and E. R. Wood in an application, Serial No. 805,585, filed April 10, 1959, issued July 18, 1961 as Patent 2,993,-095, is illustrative. Despite such measures, however, it is apparent that in a key-per-extension system the number of individual lighted keys that can be placed before an attendant is necessarily limited by such considerations as the size of the cabinet in which the keys are mounted, the physical size of the keys, the reach of the attendant, the cost of the individual keys and the operating complexities. Moreover, it is clear that other techniques may be employed which, by comparison, make the single-key-per-extension approach economically unattractive when carried out beyond some particular limit such as one hundred lines. Such techniques include, for example, key pulsing completion by means of senders, rotary dial completion, or plug and jack systems.

Accordingly, an object of the invention is to increase the capacity of a PBX without resort to key pulsing completion by senders or to rotary dialing or other semiautomatic means.

Another object of the invention is to avoid the physical size limitations imposed by the single-key-per-extension concept of PBX pushbutton consoles without sacrificing the advantages of this concept.

These and other objects are achieved in accordance with the principles of the invention by a PBX which employs a so-called group-key for each of a plurality of groups of local extensions. Additionally, a bank of local extension keys is provided, with the number of keys in the bank being equal to the number of extensions in the largest one of the extension groups. The group-keys and the local extension keys are electrically interconnected and functionally interrelated by means of a unique combination of group and local-station switching equipment.

More specifically, an illustrative PBX in accordance with the principles of the invention may readily be designed to service 1000 local extensions, for example. The employment of ten group-keys, one for each of ten groups of 100 lines, makes it possible to restrict the number of local extension keys to 100 in contrast to the 1000 local extension keys that would be required in a prior art, key-per-extension system. Group-relays and group-finders, responsive to the operation of a group-key, select and seize the group of lines which corresponds to the operated group-key. Station-finders which are in turn responsive to the operation of a station-key preceded by the operation of a group-key, are provided for completing the connection between any one of a plurality of incoming trunks and that local extension which corresponds to the pair of operated keys.

In accordance with a particular aspect of the invention each of a plurality of station-finder circuits is employed to perform each of two separate and distinct functions. Specifically, station-finder circuits may be operated selectively to seize a particular extension line in response to the operation of any one of a plurality of trunk group-finders which are in turn responsive to the successive operation of a group-key and a local extension key. Alternatively, station-finder circuits may be operated in response to the operation of an attendant's group-finder and to the successive operation of a group-key and a local extension key to complete a connection between the attendant's telephone set and a selected extension. In effect, the principles of the invention enable the main or trunk group-finders and the attendant's group-finder to share the use of a plurality of station-finders.

A number of specific features of the invention are grounded upon the broad concept of the described interrelation of group and station keys and their associated switching equipment.

In accordance with one feature, for example, the switchboard attendant is afforded the option of periodically monitoring a busy station by periodic operation of the corresponding group-key while processing other calls or of continuously monitoring the busy station by the use of a hold key which keeps the key corresponding to the busy station continuously lighted.

Another feature of the invention enables the switchboard attendant to cut through a local extension station to a central office trunk, to a distant PBX tie line, to an outside operator, or to her own telephone set by the employment of a plurality of group-finder circuits, all sharing the switching facilities provided by a single set of station-finder circuits.

A further feature of the invention is that the first level of finder-switch operation, i.e., the group-finder, is conducted in immediate response to the operation of one of the group-keys before a station-key is operated and consequently the resulting connection is effected within a minimal period of time.

The principles of the invention and additional objects and features thereof will be fully apprehended from the following detailed description of the illustrative embodiment that is shown in the appended drawing in which.

Figure 1:
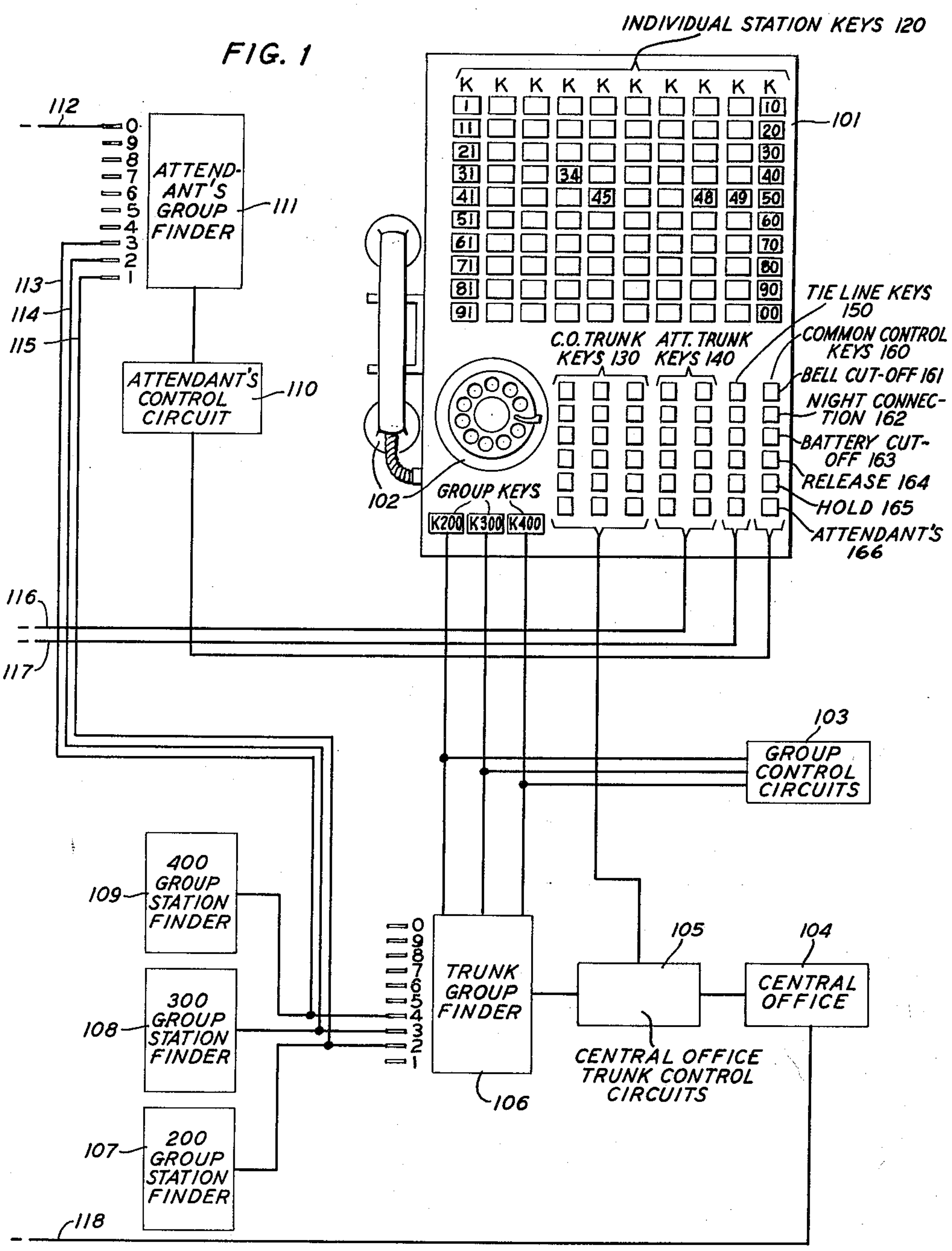
FIG. 1 is a block diagram of a PBX in accordance with the invention.

In FIG. 1 the switchboard proper or the attendant's control panel 101 may be of any convenient form. Although not apparent from the schematic plan view shown, the face of the panel 101 is typically mounted at a slight angle, sloping downwardly from the rear. As indicated by the relative size of the integrally mounted attendant's handset 102, the entire control panel 101 may be designed to occupy a relatively small space and may therefore be readily accommodated at a receptionist's desk, for example.

The largest group of pushbuttons or keys mounted on the panel 101 is the ten-by-ten array of one hundred keys designated individual station-keys 120. In the illustrative embodiment shown it is assumed that a total of three hundred local lines are served and accordingly, each of the individual keys in the individual station-key block 120 is employed in servicing calls to or from each of three local stations, the particular station served being determined selectively, in a manner yet to be described, by the operation of one of the group-keys K200, K300, or K400. The group-keys are labeled K200, K300, and K400, respectively, to correspond to the three 100 station groups which have been arbitrarily numbered 200–299, 300–399, and 400–499, respectively.

The first three vertical columns of keys 130 to the right of the attendant's handset 102 are central office trunk keys 130 and each is employed to effect a connection between the switchboard 101 and a corresponding one of the trunk lines from a central office 104. This interconnection is effected in part by wholly conventional central office trunk control circuits 105. The succeeding two vertical columns of keys 140 are attendant's trunk keys which afford a means for the local stations to call the attendant. A somewhat similar function to that provided by the central office trunk keys 130 is provided by the tie line keys 150. These keys 150 enable the attendant to effect a direct connection between the switchboard 101 and other PBX systems.

The final column of keys 160 labeled common control keys includes a bell cut-off key 161, a night-connection key 162, a battery cut-off key 163, a release key 164, and a hold key 165. The key in the lower right-hand corner of the board 101 is the attendant's key 166 which provides a means for effecting a connection between the attendant's handset 102 and any local station. The functions of the other common control keys are substantially conventional and are defined in general by the designations indicated.

With reference again to the group keys K200, K300, and K400, it will be noted that each is connected to the group control-circuits 103 and to the trunk group-finder 106. Although only a single trunk group-finder 106 is shown, it is to be understood that this representation is intended to be illustrative of the equipment required for a single trunk only for, in accordance with the principles of the invention, each trunk has associated with it an individual trunk group-finder. The trunk group-finder 106 may take any one of a number of equipment forms. Its key functions may be performed, for example, by a suitably connected step-by-step electromechanical switch of the type commonly employed in line-finder equipment in the telephone art.

As indicated schematically in FIG. 1, a step-by-step finder switch has been assumed as a part of the trunk group-finder 106. The associated trunk appears on the brushes (not shown) of the trunk group-finder 106 and, as shown, each of the bank terminals 1, 2, 3 . . . 0 of the switch bank is wired to an associated one of the station-finders 107, 108, and 109, respectively. In addition, each of the usual commutator segments (not shown) of each of these finder switches is connected to a respective one of the group keys. Although only three station-finders 107, 108, and 109 are shown, it is to be understood that in accordance with the principles of the invention a sufficient number of station-finders is provided in each group to ensure adequate handling of the estimated traffic to each of the three groups of local stations.

The functions of the station-finders 107, 108, and 109 may be performed by conventional units of step-by-step finder equipment, for example, in which the brushes of the switches are connected to the trunks from the bank terminals of the group-finders. The bank terminals of each of the station-finders 107, 108, and 109 are in turn connected to the lines in the particular group served by the switch. In addition each of the usual commutator segments (not shown) of each of these finder switches is connected to a respective one of the station keys 120.

As indicated above, each of the incoming trunks such as the central office trunks illustrated by the bank of central office trunk keys 130 is served by a trunk group-finder 106. In accordance with the principles of the invention, an attendant's group-finder 111 is employed to provide the same service for the attendant's station that the trunk group-finder 106 provides for the individual trunks. The primary distinction between these two arrangements is the fact that although there is only a single attendant's group-finder 111, there is one trunk group-finder 106 per trunk.

The specific cooperative relation which obtains in accordance with the principles of the invention among the various units of equipment shown in FIG. 1, may be demonstrated in further detail by tracing an illustrative sequence of operations. We may assume for example that a call from a distant station, not shown, on the trunk 118 is processed conventionally through the central office 104 and through the central office trunk control circuit 105 so that a distinctive signaling indication, both audible and visual occurs at the attendant's position. The attendant answers the trunk in the conventional manner by momentarily depressing the proper trunk key. Having determined by inquiry from the calling party that a particular extension such as extension 234 is being called, the attendant momentarily depresses group-key K200. This action causes the button to light which serves as an indication to the attendant that she is operating among the lines in the 200 group. Additionally, the pressing of the group-key K200 causes the lamps associated with the block of station-keys 120 to light or not to light depending upon whether the particular line in the 200 group is busy or idle. If, for example, the attendant observes that station-key 34 is not lighted, it is an indication that extension 234 is idle and the call may be completed by depressing station-key 34 for a brief interval until the lamp associated with the key 34 lights, indicating that the connection is made to the line. In the usual case following the completion of a connection of the type described, the attendant releases from the connection to handle other calls which causes the group lamp, the lamp (not shown) associated with group-key K200, for example, to go out as well as the lamps that were lighted in the station key bank 120.

As another example, it is asumed that the attendant wishes to complete a call to an extension in the 300 group, such as 345 which is busy at the time. After answering the trunk in the conventional fashion, as described above, the group-key K300 is depressed and a light on station-key 45 indicates a busy condition on the 345 line. In such a case the attendant may advise the calling party that the desired extension is busy. If the calling party wishes to wait, the attendant may depress the attendant's key 166, thereby freeing herself to handle other calls. The attendant may from time to time depress the trunk key identified with the calling party and group-key K300 and report the status of the called line to the calling party. In the event that the attendant has no other calls to process, she may depress the hold key 165 but not the attendant's key 166. This action permits the lamps associated with the individual station-keys to remain lighted and as a result, the busy station may thus be observed continuously.

Figure 2:
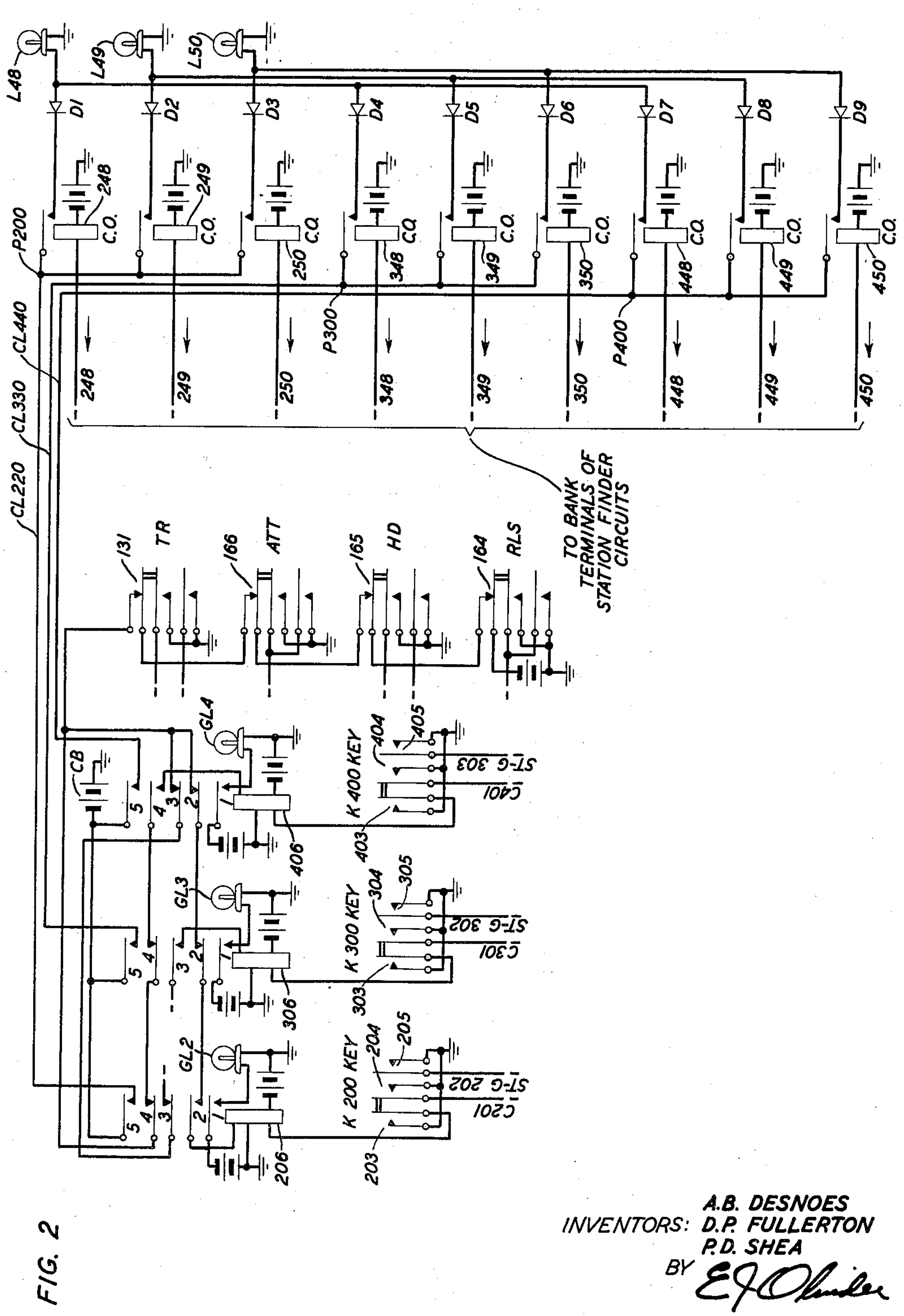
FIG. 2 is a schematic circuit diagram of the group-control circuits shown in block form in FIG. 1.
Figure 3:
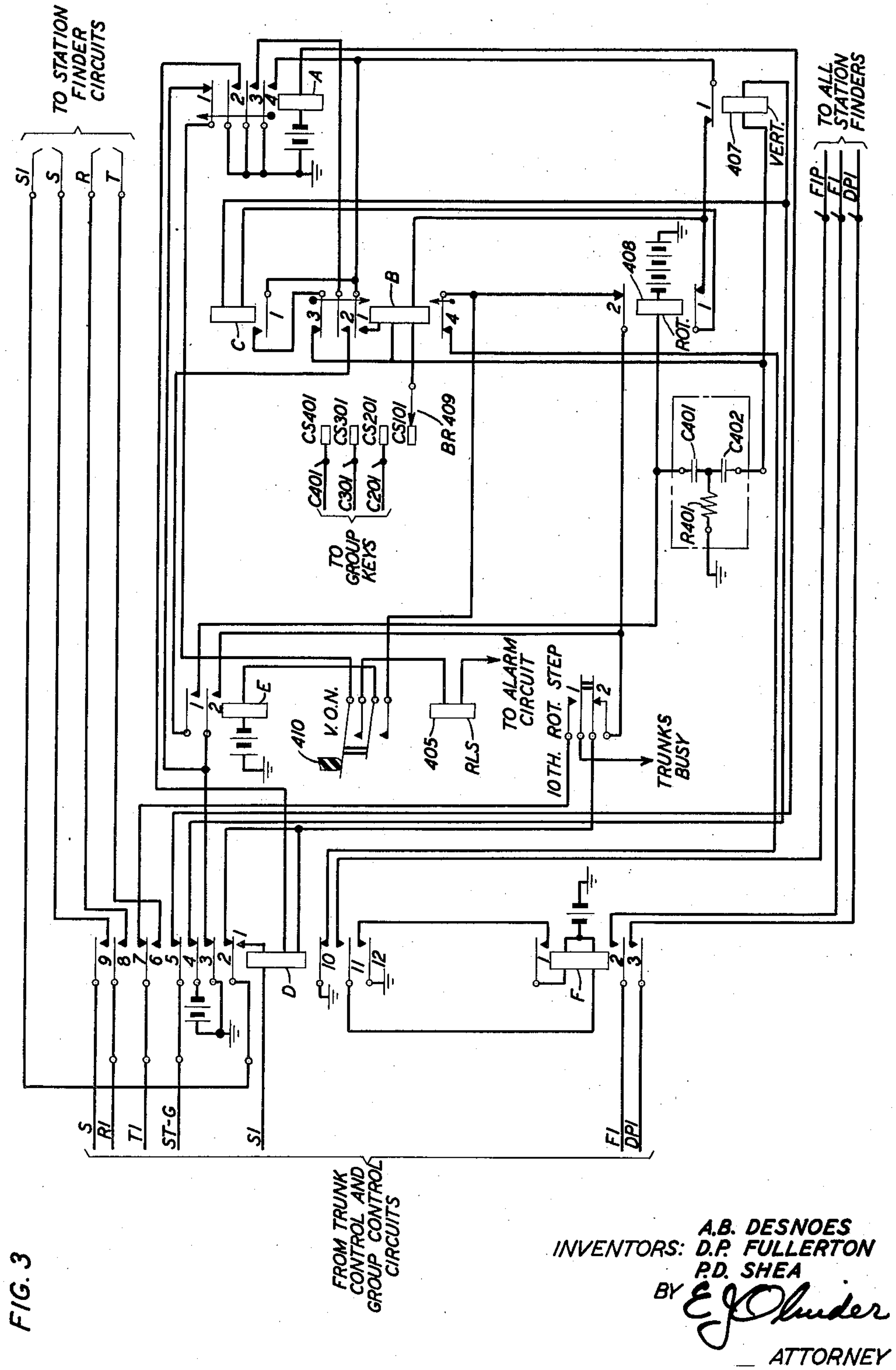
FIG. 3 is a schematic circuit diagram of one of the group-finder circuits shown in block form in FIG. 1.

To promote clarity and to avoid undue disclosure length, circuit details of the equipment shown in block form in FIG. 1 are limited to those pertaining directly to the novel features of the invention. FIG. 2, for example, is a schematic circuit diagram of the group-control circuit shown as block 103 in FIG. 1. The group-control circuit of FIG. 2 includes the group-keys K200, K300, and K400. Each key operates an associated one of the group-relays 206, 306, and 406 and an associated one of the group lamps GL2, GL3, and GL4. FIG. 2 also shows the specific interconnection of certain of the common control keys, namely attendant's key 166, hold key 165, and release key 164 with the group-keys K200, K300, and K400, and with an illustrative one of the trunk keys 131 from the group of trunk keys 130 of FIG. 1. Additionally, the group-control circuit includes a single line or cut-off (C.O.) relay for each respective local station. A C.O. relay for three stations 48, 49, and 50 in each of the three hundreds groups is shown for illustrative purposes together with the lamps L48, L49, and L50 which illuminate the corresponding keys K48, K49, and K50 (FIG. 1). The diodes D1 through D9 serve to isolate each of the C.O. relays from all of the other C.O. relays, thereby ensuring that only station lamps corresponding to busy stations will be lighter. The specific cooperative relation among the various circuit elements shown in FIG. 3 is best described in terms of an illustrative sequence of operations.

Assume, for example, that a call from an outside trunk is to be cut through to extension 248. Operation of the group-key K200 places ground on the C201 and ST–G202 leads by way of contacts 204 and 205 which initiates the operation of a group-finder in a manner to be described in detail in connection with the discussion of FIG. 3. Additionally, the operation of group-key K200 extends ground to the lower winding of group-relay 206 by way of contact 203, causing relay 206 to operate. Make contact 1 of relay 206 completes the obvious path for the operation of lamp GL2 to indicate to the attendant that she is working in the 200 group. The potential of the common battery CB is extended to point P200 by way of make contact 5 of relay 206. Assume for purposes of illustration that lines 248, 348, and 448 are all busy, and in this case the respective cut-off relays are therefore operated. Additionally, lamp L48 is lighted from the common battery CB by way of a conducting path which includes diode D1 and the closed contact of relay C.O. 248. In this instance, no other lamps can be lighted for it is assumed that only lines 248, 348, and 448 are busy and although the relays corresponding to these lines are operated, only relay 206 of the corresponding group relays is operated to complete a path to the common battery CB.

As an additional example of the operating characteristics of the system it is asumed that extension 348 is busy but 248 is idle and that a connection is to be cut through to extension 248. Potential from the common battery CB is applied to point P200 in the same fashion as described above so that each of the lamps in the 200–299 group such as lamp L49, for example, which may correspond to a busy station such as 249 is lighted. The closed contacts of operated C.O. relays in other groups, however, cannot serve as conducting paths to apply battery potential to a point such as P300 because of the unidirectional characteristics of the diodes D1 through D9 and accordingly lamp L48 remains unlighted even though extension 348 is busy.

In accordance with one of the features of the invention, an interlocking arrangement is provided so that only one group-key is effective at a given time. Thus, for example, if the group-key K200 has been operated, relay 206 is held operated by current in the circuit which extends from ground through the upper or secondary winding of relay 206, its own make contact 2, the normally closed break contacts 2 of relays 306 and 406 and the uppermost contact of trunk relay TR131 and the uppermost contact of each of the common control relays 166, 165, and 164 and thence to the battery adjacent the release key 164. In the event the group-key K300 is then operated, break contact 2 of relay 306 opens, breaking the chain circuit described and releasing the group relay 206. Any one of the group circuits may also be released by the operation of the release key 164 which also serves to break the chain circuit described.

For the purposes of the instant disclosure indicating lamps such as GL2, GL3, GL4, L48, L49, and L50 are assumed to be either OFF or steadily ON. It is apparent, however, that means providing for various winking or flashing combinations to indicate more specifically the particular operating conditions in the various circuits are fully compatible with a PBX in accordance with the invention disclosed herein. Means providing for the coded flashing of PBX indicator lamps are shown by Arnold et al., for example, in the application cited above.

With reference again to FIG. 1, the trunk group-finder 106 is shown schematically to be interrelated with the group control keys K200, K300, and K400, with the group-control circuits 103, with the central office trunk-control circuits 105 and with the station-finders 107, 108, and 109. In accordance with the principles of the invention, one trunk group-finder per trunk is employed and the broad function of each is to select an idle station-finder from among that group of station-finders which is designated by the operation of one of the group-keys and thereby to contribute to the completion of a connection between a selected local extension and the trunk line which is associated with the particular trunk group-finder. As indicated above, the central office trunk control circuits 105 and station-finders 107, 108, and 109 are fully conventional in the telephone art and illustrative forms of such circuits are shown, for example, in the Arnold et al. application cited above. The employment of a so-called trunk group-finder in a PBX is unique, however, and accordingly such employment is shown in detail in FIG. 3.

With specific reference now to FIG. 3, the unterminated leads at the left or input side of the circuit include the tip, ring and sleeve conductors T1, R1, S and S1 and the station-finder starting leads F1 and DP1, all from the central office trunk control circuits 105 (FIG. 1). The ST–G lead is from the group-control circuit shown in detail in FIG. 2 and, as indicated, ground is extended to this lead by the operation of a group-key such as key K200. Ground on the ST–G lead is extended over the obvious path to operate relay A opening break contact 1 and closing make contacts 2, 3, and 4. One result of the operation of relay A is the completion of an operating path for relay C from ground at relay A over contact 4 of relay A, contacts 1 of the vertical magnet 407 and the rotary magnet 408, the winding of relay C and thence to battery by way of contact 4 of relay D. The closure of contact 1 of stepping relay C completes an obvious path, which includes contact 4 of relay D, to operate the vertical magnet 407 which steps the shaft up (not shown). Relay C is in turn released immediately by virtue of the opening of the holding path of relay C at break contact 1 of vertical magnet 407. The release of relay C releases vertical magnet 407 which again results in the operation of relay C as described. This vertical stepping cycle repeats until the commutator brush BR409 reaches one of the commutator segments such as CS201 to which ground has been extended over lead C201 by the operation of group-key K200 (FIG. 2). When such a segment is reached, relay B is caused to operate in series with relay C which serves to prevent further stepping of relay C. Relay B is made slow-operate to give a short time delay between the last vertical step and the first rotary step to prevent snagging of the wipers due to vibration. As soon as the vertical shaft 410 moves off-normal, which occurs on the first vertical step, V.O.N. contact 2 is closed and ground is extended to relay E over a path which also includes contact 4 of relay B and contact 10 of relay D. As a result, relay E operates, thereby preparing the circuit for the first rotary step which occurs upon the operation of relay B.

When relay B operates under the conditions described, the stepping function is shifted to the rotary magnet 408 from the vertical magnet 407. The rotary magnet 408 operates by virtue of the extension of ground to its coil over a path which includes its break contact 2 and accordingly the rotary magnet 408 steps. The operation of the rotary magnet 408 steps the brush (not shown), carrying the S1 lead to the first set of terminals in the multiple bank (not shown). As indicated above, there may be a number of station-finders for each group of local extensions, the particular number being dependent on the volume of traffic to be handled. In accordance with the invention, each group of station-finders is connected to the banks of a corresponding one of the group-finders. If the first station-finder reached by the brushes is busy, the sleeve terminal S1 is grounded which ground is extended to one side of the winding of relay D by way of break contact 2 of relay D. In effect, the winding of relay D is shunted, for ground is also extended to it at the opposite end by way of contact 2 of relay A. Accordingly, relay D is released immediately but relay E reoperates. Upon the operation of relay E rotary magnet 408 is again energized and this stepping operation continues until an idle, ungrounded sleeve terminal is reached.

When an idle sleeve terminal (indicating an idle station-finder) is reached, there is no ground on sleeve lead S1 and consequently relay D is permitted to operate, ground being extended by way of contact 2 on relay A. Relay E does not operate, however, for the reason that the winding of relay E is of a relatively low resistance in comparison to the winding of relay D. Relay D operated closes the talking and sleeve circuits S1, S, R, and T through to the station-finder selected. Additionally, operation of relay D removes ground from relay A by opening the ST–G lead at contact 5 of relay D, and relay A releases.

Upon the extension of ground to lead FIP in the station-finder circuit selected a circuit is completed by way of make contact 11 of relay D for the operation of relay F. Relay F locks up through its own make contact 1 and make contact 12 of relay D to ground. This control over relay F ensures that the F1 and DP1 leads do not conduct prematurely in their respective control circuits.

Specific implementing circuitry for the station-finders illustrated in block form in FIG. 1 is not disclosed herein for the reason that it may be substantially conventional in form, one illustrative form being shown, for example, in the Arnold et al. application cited above. The attendant's control-circuit 110 serves the same function with respect to the attendant's group-finder 111 as the central office trunk-control circuits 105 serve with respect to the trunk group-finder 106 and the equipment employed may be substantially identical. Similarly, as indicated above, the attendant's group finder 111 is substantially identical from the standpoint of both function and structure to the trunk group-finder 106, discussed in detail in connection with the description of FIG. 4, bearing in mind that in accordance with the invention a trunk group-finder serves a specific trunk while the attendant's group-finder serves the attendant's station.

It is to be understood that the above-described arrangements are merely illustrative of the application of the principles of the invention. Numerous other arrangements may be designed by those skilled in the art without departing from the spirit and scope of the invention.

What is claimed is:

1. A private branch exchange telephone system comprising, in combination, a control panel, a plurality of extension stations, a first bank of manually operable illuminatable keys on said control panel each corresponding to a respective one of a first plurality of groups of said stations, a second bank of manually operable illuminatable keys on said control panel each corresponding to a respective one of a second plurality of groups of said stations, each of said second groups comprising a single respective station from each of said first groups, and means responsive to the momentary operation of a key in said first bank followed by the operation of a key in said second bank for completing a connection between said control panel and a single respective one of said stations.

2. A private branch exchange telephone system comprising, in combination, a control panel, a plurality of extension stations, a first bank of manually operable illuminatable keys on said control panel each corresponding to a respective one of a first plurality of groups of said stations, a second bank of manually operable illuminatable keys on said control panel each corresponding to a respective one of a second plurality of groups of said stations, each of said second groups comprising a single respective station from each of said first groups, means responsive to the momentary operation of a key in said first bank followed by the operation of a key in said second bank for completing a connection between said control panel and a single respective one of said stations, means responsive to the momentary operation of any one of said first bank of keys for illuminating said one key and means jointly responsive to the operation of said one key and to a busy condition at any one of said stations for illuminating that key in said second bank which in combination with said one key in said first bank identifies said busy station.

3. In a private branch exchange telephone system comprising, in combination, a control panel, a plurality of incoming trunks, a first bank of manually operable illuminatable keys on said control panel each corresponding to a respective one of said trunks, a plurality of local extension stations, a second bank of manually operable illuminatable keys on said control panel each corresponding to a respective one of a first plurality of groups of said stations, a third bank of manually operable illuminatable keys on said control panel each corresponding to a respective one of a second plurality of groups of said stations, each of said third groups comprising a single respective station from each of said second groups, and means responsive to the momentary sequential operation of a key from each of said banks for cutting through the trunk corresponding to the key from said first bank to the local extension corresponding to the combination of the key from said second bank and the key from said third bank.

4. A private branch exchange telephone system comprising, in combination, a control panel, a plurality of incoming trunks, a first bank of manually operable illuminatable keys on said control panel each corresponding to a respective one of said trunks, a plurality of local extension stations, a second bank of manually operable illuminatable keys on said control panel each corresponding to a respective one of a first plurality of groups of said stations, a third bank of manually operable illuminatable keys on said control panel each corresponding to a respective one of a second plurality of groups of said stations, each of said third groups comprising a single respective station from each of said second groups, means responsive to the momentary sequential operation of a key from each of said banks for cutting through the trunk corresponding to the key from said first bank to the local extension corresponding to the combination of the key from said second bank and the key from said third bank, said last named means comprising a trunk group finder for each of said trunks and at least one station-finder for each of said first plurality of groups of said stations.

5. A private branch exchange telephone system comprising, in combination, a control panel, a plurality of incoming trunks, an attendant's subset mounted integrally with said control panel, an attendant's manually operable illuminatable key mounted on said control panel, a first bank of manually operable illuminatable keys on said control panel each corresponding to a respective one of said trunks, a plurality of local extension stations, a second bank of manually operable illuminatable keys on said control panel each corresponding to a respective one of a first plurality of said stations, a third bank of manually operable illuminatable keys on said control panel each corresponding to a respective one of a second plurality of groups of said stations, each of said third groups comprising a single respective station from each of said second groups, first means responsive to the momentary sequential operation of a key from each of said banks for cutting through the trunk corresponding to the key from said first bank to the local extension corresponding to the combination of the key from said second bank and the key from said third bank, and second means responsive to the momentary sequential operation of said attendant's key, of a key from said second bank and of a key from said third bank for cutting through said attendant's subset to that one of said local extensions identified by the combination of said last two named keys.

6. Apparatus in accordance with claim 5 wherein said first means comprises a trunk group-finder for each of said trunks, wherein said second means comprises a single attendant's group-finder, and wherein said first and second means each include, in common, at least one station-finder corresponding to each of said second groups, said station-finders being operatively responsive to said trunk group-finders and to said attendant's group finder.

7. Apparatus in accordance with claim 5 including a plurality of group relays, each responsive to the momentary operation of a respective one of said keys in said second bank for completing a conducting path for the illumination of its corresponding key and for completing a conducting path for the illumination of each of the keys in a corresponding group of keys in said third bank to indicate a busy condition at the local stations identified thereby.

8. Apparatus in accordance with claim 7 including means responsive to the operation of each of said relays for releasing any operated other one of said relays thereby ensuring control by only one of said group relays at any given time.

9. A private branch exchange telephone system comprising, in combination, a control panel, a plurality of extension stations, a first bank of manually operable illuminatable keys on said control panel each corresponding to a respective one of a first plurality of groups of said stations, a second bank of manually operable illuminatable keys on said control panel each corresponding to a respective one of a second plurality of groups of said stations, each of said second groups comprising a single respective station from each of said first groups, a third bank of manually operable illuminatable keys on said control panel each corresponding to a respective trunk line, an attendant's handset, a manually operable illuminatable attendant's key, means including a plurality of group finder stepping switches and station-finder stepping switches responsive to the successive momentary operation of a key from each of said banks for cutting through one of said trunks to one of said stations, and means including a single attendant's group-finder stepping switch and said station finder stepping switches responsive to the successive momentary operation of said attendant's key and to a key from said first and second banks for cutting through said attendant's subset to one of said local stations.

References Cited in the file of this patent

UNITED STATES PATENTS

| | | |
|---|---|---|
| 1,559,251 | Harper | Oct. 27, 1925 |
| 2,993,095 | Arnold et al. | July 18, 1961 |